US010307906B2

(12) United States Patent
Shah et al.

(10) Patent No.: US 10,307,906 B2
(45) Date of Patent: Jun. 4, 2019

(54) SYSTEM AND METHOD FOR PROVIDING A PROACTIVE PROCESS AUTOMATION AMONG A PLURALITY OF SOFTWARE ROBOTIC AGENTS IN A NETWORK

(71) Applicant: Tata Consultancy Services Limited, Mumbai (IN)

(72) Inventors: Ruchi Rajan Shah, Gandhinagar (IN); Prema Rameshchandra Choubey, Gandhinagar (IN); Subramanyam A R, Chennai (IN); Ravi Kethana, Chennai (IN); Bhakti Chandulal Chandarana, Gandhinagar (IN)

(73) Assignee: Tata Consultancy Services Limited, Mumbai (IN)

( * ) Notice: Subject to any disclaimer, the term of this patent is extended or adjusted under 35 U.S.C. 154(b) by 242 days.

(21) Appl. No.: 15/071,718

(22) Filed: Mar. 16, 2016

(65) Prior Publication Data

US 2017/0173784 A1    Jun. 22, 2017

(30) Foreign Application Priority Data

Dec. 22, 2015   (IN) .......................... 4816/MUM/2015

(51) Int. Cl.
*G06F 13/00*     (2006.01)
*B25J 9/00*      (2006.01)
(Continued)

(52) U.S. Cl.
CPC .......... *B25J 9/0084* (2013.01); *G06F 9/4843* (2013.01); *G06F 9/54* (2013.01); *G06Q 10/06* (2013.01);
(Continued)

(58) Field of Classification Search
CPC ..... H04L 12/2602; H04L 41/22; H04L 29/06; H04L 29/08072; H04L 43/00;
(Continued)

(56) References Cited

U.S. PATENT DOCUMENTS 5,448,225 A    9/1995  Maignon et al.
8,095,238 B2   1/2012  Jones et al.
(Continued)

FOREIGN PATENT DOCUMENTS

CN    201156186    11/2008

OTHER PUBLICATIONS

Defense Advanced Research Projects Agency Information Processing Techniques Office, Internet Protocol (DARPA Internet Program), RFC 791, pp. 1-50; Published: Sep. 1981.*

*Primary Examiner* — Robert B Harrell
(74) *Attorney, Agent, or Firm* — Finnegan, Henderson, Farabow, Garrett & Dunner LLP

(57) ABSTRACT

The disclosure generally relates to functioning and monitoring of robots, and more particularly, to closely monitor, administer, and track an autonomous software robots. The embodiments herein relate to automating of a plurality of repetitive tasks by deploying a plurality of software robots in an operation floor. By using the robotic console module, an administrator is able to get a holistic view of the plurality of robots deployed at various client workstations. The administrator is also capable of viewing robots deployed, the ability to start and stop of the robots and view alerts raised by the robots during execution.

12 Claims, 7 Drawing Sheets

(51) Int. Cl.
  *H04L 29/06* (2006.01)
  *G06F 9/48* (2006.01)
  *G06F 9/54* (2006.01)
  *G06Q 10/06* (2012.01)

(52) U.S. Cl.
  CPC ....... *G06Q 10/063* (2013.01); *G06Q 10/0633* (2013.01); *H04L 63/0428* (2013.01)

(58) Field of Classification Search
  CPC ... H04L 63/0428; B25J 9/1697; B25J 9/0084; B25J 9/1617; B25J 9/1682; G05B 19/4182; G05B 19/41815; A61J 7/0084; B65G 1/1376; B65G 2209/08; G06F 9/54; G06F 9/4843; G06F 13/00; G06Q 10/06; G06Q 10/08; G06Q 10/063; G06Q 10/087; G06Q 10/0633
  USPC .......................................... 700/248; 709/224
  See application file for complete search history.

(56) References Cited

U.S. PATENT DOCUMENTS

2005/0234592 A1  10/2005  McGee et al.
2011/0153079 A1*  6/2011  Jung ................ G05B 19/41865
                                                    700/248

* cited by examiner

SYSTEM AND METHOD FOR PROVIDING A PROACTIVE PROCESS AUTOMATION AMONG A PLURALITY OF SOFTWARE ROBOTIC AGENTS IN A NETWORK

PRIORITY CLAIM

This U.S. patent application claims priority under 35 U.S.C. § 119 to: India Application No. 4816/MUM/2015, filed on Dec. 22, 2015. The entire contents of the aforementioned application are incorporated herein by reference.

TECHNICAL FIELD

The disclosure generally relates to functioning and monitoring of robots, and more particularly, to closely monitor, administer, and track an autonomous software robots.

BACKGROUND

In the field of computing, a software agent is a computer program that acts for a user or other program in a relationship of agency. Particularly, in robotics, robot software is a set of coded commands that inform a mechanical device and electronic system the kind of tasks to perform and automate. Several software systems and frameworks have been proposed to make programming robots easier. Generally, robot software is used to perform tasks and automate tasks to be performed.

The software architecture of a robotics system comprises of various software components used to design and operate the software. All programming methods rely on software architecture as a method of organizing a software system since it not only provides communication support but is also a critical component in hardware and software interfaces. Although, autonomous mobile robots and the software controlling them have steadily evolved in both complexity and functionality in recent years, there still continues to be several challenges.

Generally machine to machine communications over the internet using HTTP and HTML is problematic. The fundamental reason for that is that HTML is more suitable as a publishing format, rather than a data exchange format. Programs that access websites, that are normally accessed by human users sitting at a computer using a web browser, are called 'software robots', 'robots', 'software agents', 'agents', 'programs' and so on.

Programs that access (for example) web sites appear from a network and data presentation format, to the web site as an end user would. The web site or web application receives and sends information exactly as it would to a real human user, but instead the information is received, processed, and responded by a piece of software running on a computer somewhere on the Internet, rather than a live human user using a web browser. In these applications, the web site, or web application does not know it is communicating with anything other than a web browser, when in fact it is communicating with a piece of custom written software.

The inventors here have recognized several technical problems with such conventional systems, as explained below. Currently, majority of robotic process automation applications are written by software programmers. Conventional techniques do not focus on automatically facilitate software robots that can manipulate existing websites and web applications. The net effect of this facilitation is a dramatic reduction in the amount of time necessary to implement machine to machine communications that utilize existing web sites and web applications.

Currently, there are several autonomous robots and robotic softwares that are developed to navigate or work as mobile robots to either perform household or industrial chores. However, there seems to be a lack of concurrent and holistic development of software to automate repetitive processes. There is an unmet need for a system and a method for process automation of multi-tier applications in a computer network having a plurality of computers. Additionally, there is also an unmet need for such application in process automation in which a plurality of application components on a plurality of computers have inter-connected functionality.

SUMMARY

Embodiments of the present disclosure present technological improvements as solutions to one or more of the above-mentioned technical problems recognized by the inventors in conventional systems. For example, in one embodiment, a computer implemented system for implementing intelligent and proactive process automation among a plurality of software robotic agents. The system comprises of a robotic console module that is configured to continuously check and monitor a plurality of deployed software robotic agents in a network. The system further comprises of a graphical user interface that is configured to provide an interactive dashboard to view at least one of real time data and historical data to deploy a plurality of the software robotic agents, a heartbeat service module configured to verify and maintain secure connectivity with at least one client in said network on a pre-defined interval. The system furthermore comprises, an archive service module configured to maintain and process the historical data of the deployed software robotic agents and a communication service module configured to dynamically check a target environment in the deployed software.

In another embodiment, a computer program product for implementing intelligent and proactive process automation among a plurality of software robotic agents is disclosed. The computer program product comprises of a robotic console module that is configured to continuously check and monitor a plurality of deployed software robotic agents in a network. The computer program product further comprises of a graphical user interface that is configured to provide an interactive dashboard to view at least one of real time data and historical data to deploy a plurality of the software robotic agents, a heartbeat service module configured to verify and maintain secure connectivity with at least one client in said network on a pre-defined interval. Furthermore, the computer program product comprises, an archive service module configured to maintain and process the historical data of the deployed software robotic agents and a communication service module configured to dynamically check a target environment in the deployed software.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed embodiments.

DETAILED DESCRIPTION OF EMBODIMENTS

Figure 1:
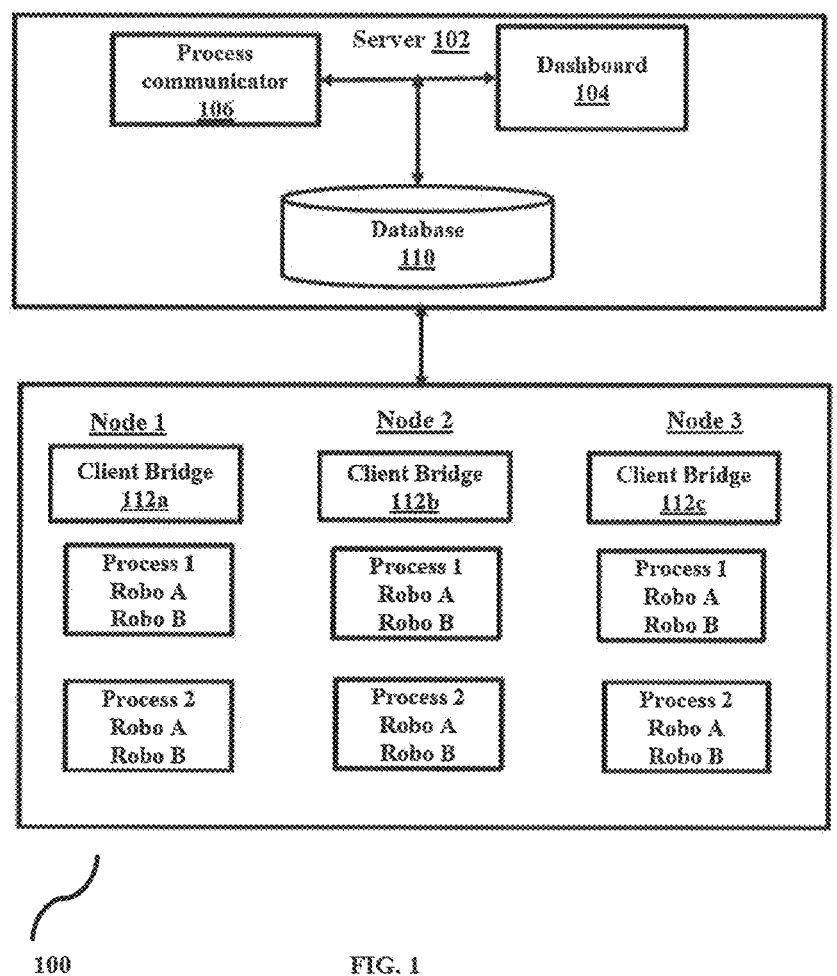
FIG. 1 illustrates a functional block diagram of a Software Robotic processing system 100, in accordance with some embodiments from the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 4c, where similar reference characters denote corresponding features consistently throughout the figures, there are shown preferred embodiments and these embodiments are described in the context of the following exemplary system and/or method.

FIG. 1 illustrates a functional block diagram of a Software Robotic processing system 100, according to the embodiments as disclosed herein. As depicted in FIG. 1, the Software Robotic processing system 100 comprises of a server 102. The server 102 in turn comprises of a Dashboard 104, a Process communicator 106, and a Database 110. Although the present disclosure is explained by considering a scenario that the server 102 is implemented as an application. It may be understood that the server 102 is capable of supporting multiple robotic applications and users. It will be understood that the server 102 may be accessed by multiple users through one or more peer devices such as a client device (not shown in Figure) or applications residing on the client device. In one example, the client device may include, but are not limited to, a portable computer, a multi-touch surface, a personal digital assistant, a handheld device, and a workstation. The client device is communicatively coupled to the server 102 through a network (not shown in Figure). In an embodiment, there are two sets of devices that can be implemented such as 1) where the robotic applications are executed and 2) where the end user can be used to monitor the execution of the applications running at a given point of time.

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one embodiment, the server 102 may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the Software robotic processing system 100 to interact with a user directly or through the client devices. Further, the I/O interface may enable the intermediary server to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one embodiment, the client device may include one or more processors, one or more memories, and a display. The one or more processors may be implemented as one or more microprocessors, microcomputers, microcontrollers, digital signal processors, central processing units, state machines, logic circuitries and/or any devices that manipulate signals based on operational instructions. Among other capabilities, the one or more processors are configured to fetch and execute computer-readable instructions stored in the one or more memories.

The display may include a LCD display, a LED display and other displays that are obvious to persons skilled in the art.

Among other capabilities, the one or more processors are configured to fetch and execute computer-readable instructions stored in the one or more memories. The one or more memories may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Referring back to FIG. 1, the Software Robotic processing system 100 is configured to function as a process administrator by using a monitoring capability on a plurality of software robots deployed on a floor along with a live view dashboard. In essence, the Software Robotic processing system 100 is configured to work as a robotic component to monitor a plurality of software robots in action, when such software robots are deployed in the network.

In a preferred embodiment, the Software Robotic processing system 100 is capable of performing a plurality of activities such as capability to listen to client devices (machines/node) on the deployed processes and current execution processes. The dashboard 104 is capable of providing real time status of the different processes in execution on the specific nodes. By viewing history of execution of a plurality of processes on a node, the same history can be extended to provide an analytics layer to determine the efficiency of process automation. The Software Robotic Processing system 100 further comprises a communication service module that is configured to check and monitor a target environment of the surroundings in which it is implemented.

Further, the Software Robotic processing system 100 provides administration capability of a plurality of starting or stopping instances of at least one process on a configured node. Administration capability is also provided for tracking of the nodes (machines) connected in the network and to configure the processes to execute on these nodes. An alert window in the Dashboard 104 provides a first view or initial view on the process robots, when process robots either abort or terminate.

The dashboard 104 is also configured to view current (live) and historical (data) of robot execution either through a process view or client node view. In an embodiment, the process scheduler 206 is configured to process a mechanism in order to capture the execution schedule for a process (daily, weekly, and/or at periodic intervals) along with the ability to execute a plurality of instructions based on the defined schedule.

Figure 2:
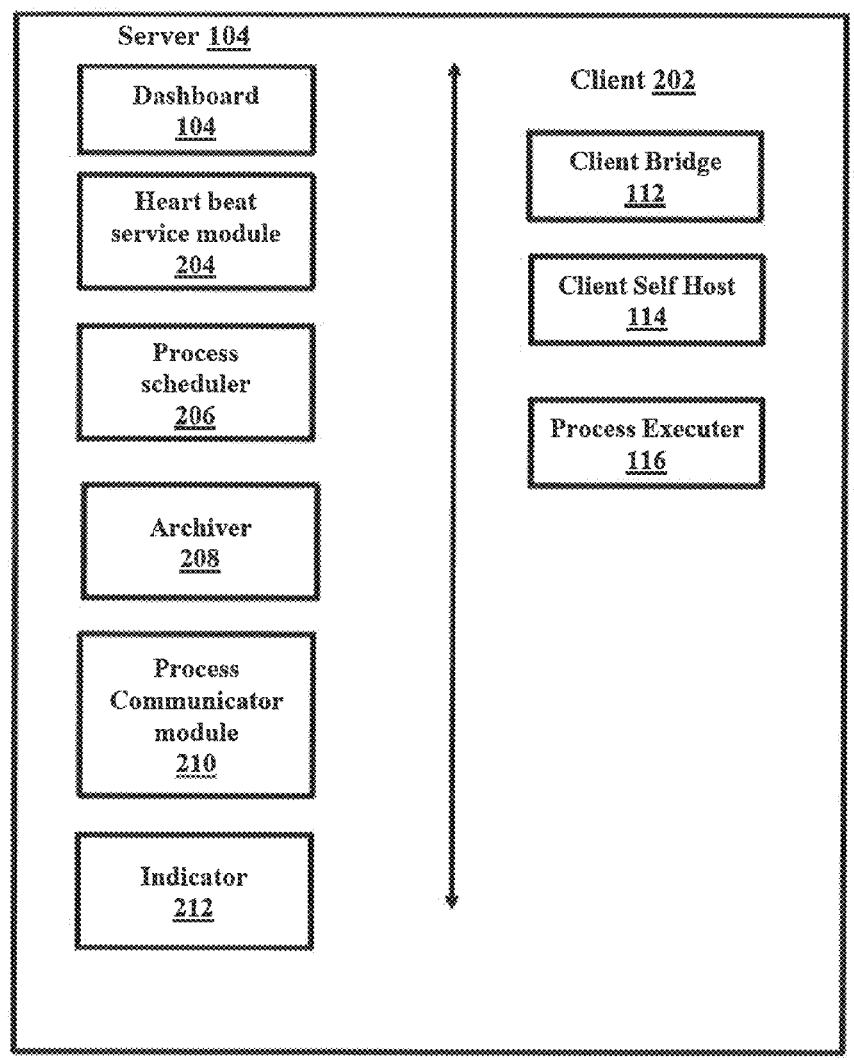
FIG. 2 illustrates a detailed component diagram of the software robotic processing system 100, in accordance with some embodiments from the present disclosure.

FIG. 2 illustrates a detailed component diagram of the software robotic processing system 100, according to the embodiments as disclosed herein. The dashboard 104 is predominantly configured to work as a GUI suite and is used to view the live and historical data on the execution of a plurality of processes/robots in a particular client node. The dashboard 104 also includes ability to administer (start and/or stop a process in execution). Initially a suite of services are deployed at the Server 102 and client machine such as:

a) An heart beat service to verify and identify the connectivity with a plurality of client nodes in the network on a pre-defined period interval
b) An archive service adapted to archive a periodic or daily execution of the processes/software robots and accordingly maintain a historical record of execution of the plurality of processes/robots for a specific period.
c) A plurality of communication service components that facilitate a secured communication channel between end points such as server station and client desktop station. Initially, communication is initiated on event happenings (such as start of a process, completion and/or termination of the process).
d) A 'client bridge service' that is deployed at the client node through which a plurality of individual process (robots) communicate to the server 102. This service provides loose coupling between the plurality of software (process) robots and the communication service at the client desktop.

In an embodiment, the Heart beat service module 204 verifies connection or connectivity with a plurality of nodes and updates the database 110 accordingly. The heart beat service module 204 is deployed at the server end and accordingly establishes communication with each client node (using a DNS hostname) and procures its heart beat at periodic intervals. The duration of intervals can be configured according to user's convenience.

The process scheduler 206 is configured to facilitate the database 110 and schedule a plurality of processes against connected nodes with suitable status based on the scheduling information captured. The process scheduler is deployed at the server 102 end and can be user configured to run at a specific time.

The archiver 208 is configured to maintain daily or periodic history of information related to execution of processes and copies in order to archive tables. The archiver 208 is executed at the server 102 end and can be scheduled to run at a specific time which is user configurable.

The process communication module 210 is configured to work as a listener, monitor, and instructor at the server 102. The process communication module 210 listens to a plurality of messages sent by a client self-hosted WCF™ about execution of processes and software robots. The process communication module 210 monitors execution and updates database 110 on a regular basis. Further, the process communication module 210 deployed at the server 102 end instructs a plurality of nodes to either start or stop processes on nodes, based on instructions sent by an Administrator through the GUI.

The indicator 212 is configured to continuously run at the server 102 and checks for periodic processes in progress since a long time and updates status as Timed out, in case the process is not responding.

In an embodiment, the client bridge 112a is hosted at the client end to ensure that each process communicates with the client self-host 114 by providing a bridge between client and server 102 in order to send and receive messages about execution of processes and robots.

The process executer 116 is capable of initiating process execution at client workstations based on daily scheduling information received at the server 102 end. The process executer 116 starts the robotic application on a plurality of user devices based on a schedule maintained at the server 102.

According to preferred embodiments of the present invention, a management server, which can be access by one or plurality of consoles, for monitoring and controlling the automated application processes is provided, such that one or more users may more preferably adjust the deployment or maintenance (or any other application process), or at least optionally view deployment progress. Such management server preferably enables the software product to be deployed, managed, verified, monitored and tracked from a single location, using the console.

In an operational scenario, an human user/operator obtains an excel file containing the different accounts that need to be created for a plurality of customers along with relevant customer details. The user initially opens an account opening app (legacy app) and then the operator manually copies the details in the Software Robotic processing system 100. The Software Robotic processing system 100 then takes control and create the accounts. This is considered as a repeatable task. The robot mimics the entire operation after training, thus reducing dependency on humans. The robot is also trained to detect discrepancies and is configured to discontinue/abort the application in such cases. The human user gets a message on his laptop/desk top or any suitable computing device in case of such discrepancies such as system restart or network outage.

Customization parameters can be defined for each such script. Such parameters may include for example, whether to run it automatically or after an approval of the user to a pop-up question, and specific times (for example, only weekends or only evenings) that a facilitating script is active, etc.

As an example of the automated learning of relations, suppose the operator works on a business process involving a web application and a mainframe system. The operator starts with the web application in which they get a customer's details and then they need to go into the mainframe system and perform some action for the customer (in this example, change the address of the customer.). A way to improve this manual business process is to have the system automatically learn the relations between the current set and the active screen.

When a relation appears between information seen in one screen and information that is entered in a later screen, this relation is stored in a long term memory. After a few iterations going through the same screens, if the relation is repeated a predetermined number of times, the software application uses this relation to suggest to the operator to automatically fill in the fields associated with this relation. The number of times an action is repeated to constitute a reason to suggest that action in the future, may be customized by a user. Also, it may be defined that there is no contradicting behavior which should be considered.

Another example would be the case where password verification is required. This can be a time consuming process where sometimes both intranet user id and password are to be filled taking up about 20 seconds of the user time. In principle, this problem can be resolved by preparing appropriate facilitating script that would identify the verification screen and fill in the necessary information. However, this would mean that the operator would have to know and install such a feature. Using an adaptive approach, this would not be necessary. The system of the present application would identify automatically the correlation between password verification request and appropriate information being filled. After several cases, user verification would be done automatically.

Figure 3:
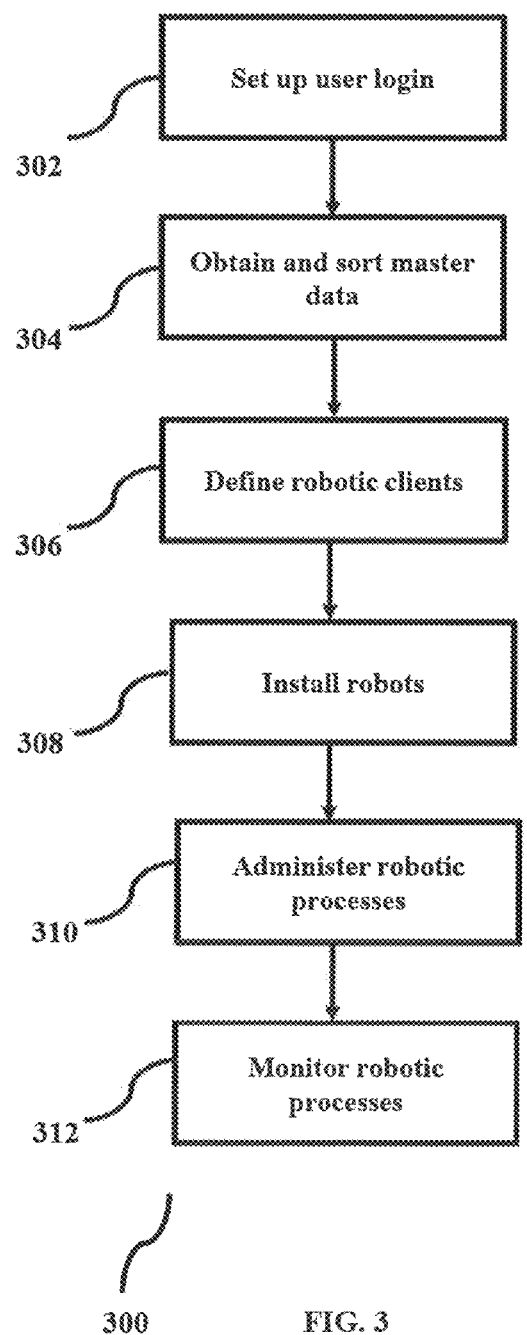
FIG. 3 is a flow diagram depicting the process steps in the software robotic processing system 100, in accordance with some embodiments from the present disclosure.
Figure 4A:
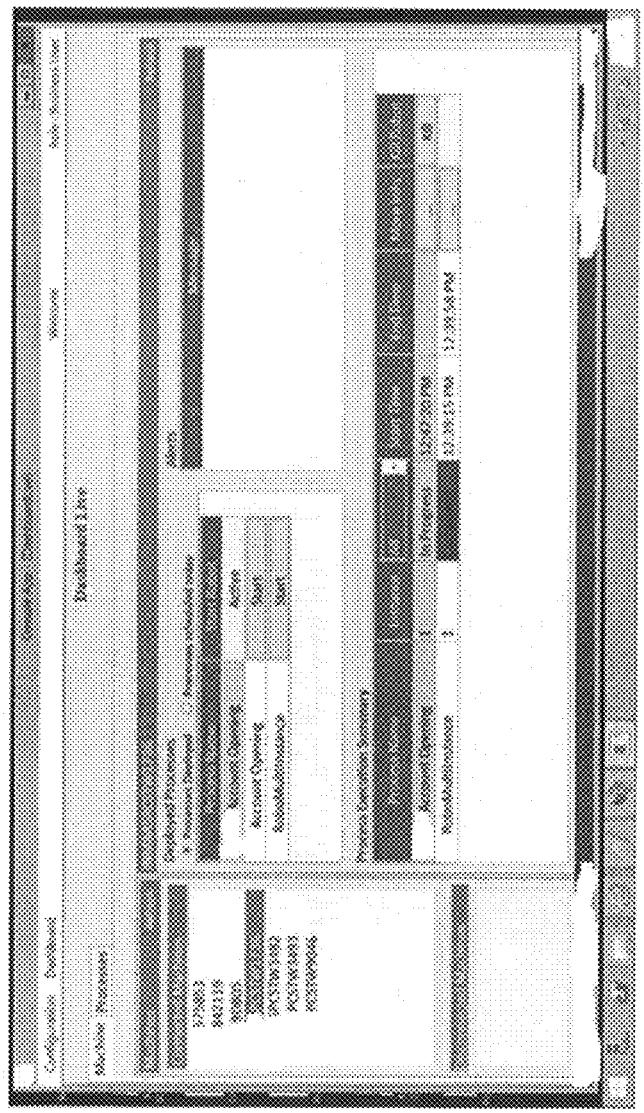
FIGS. 4a, 4b, 4c and 4d depict individual screenshots at different stages of an automation in an execution process, in accordance with some embodiments from the present disclosure.
Figure 4B:
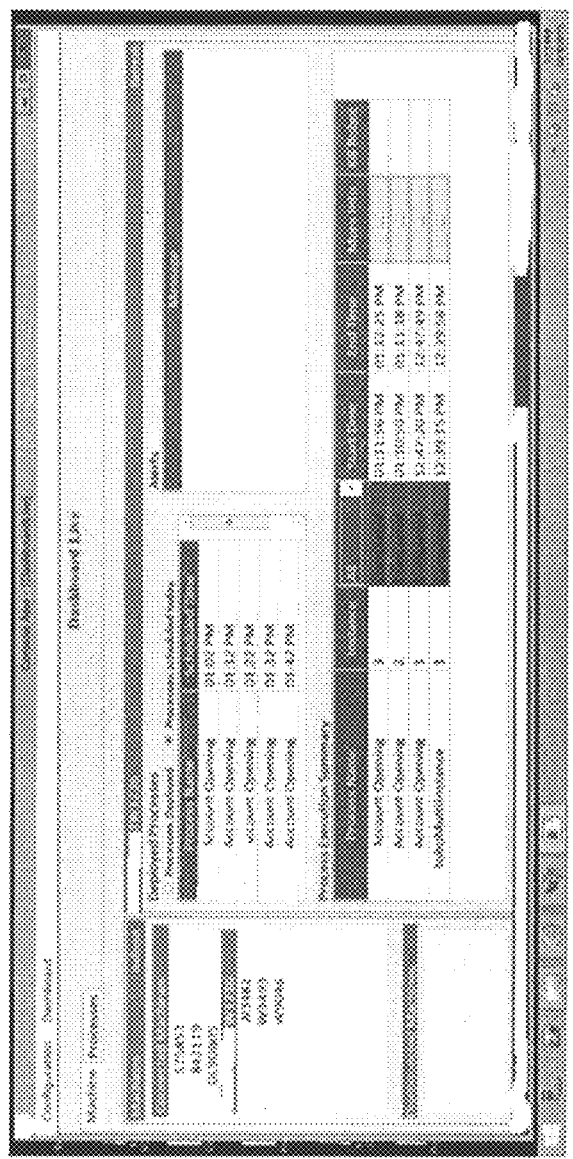
Figure 4C:
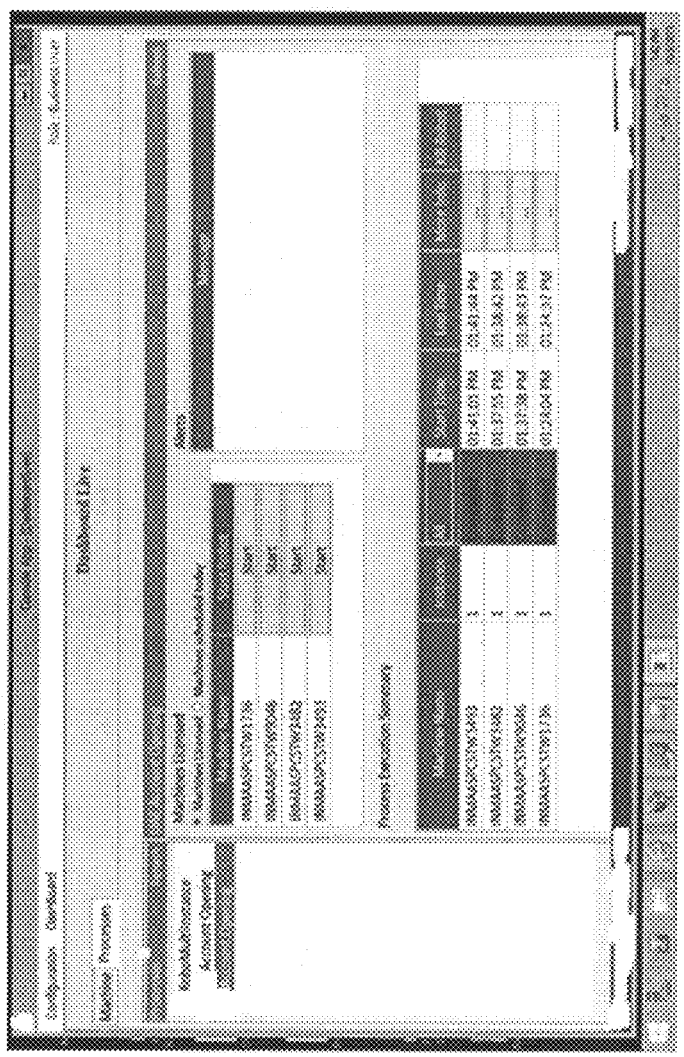
Figure 4D:
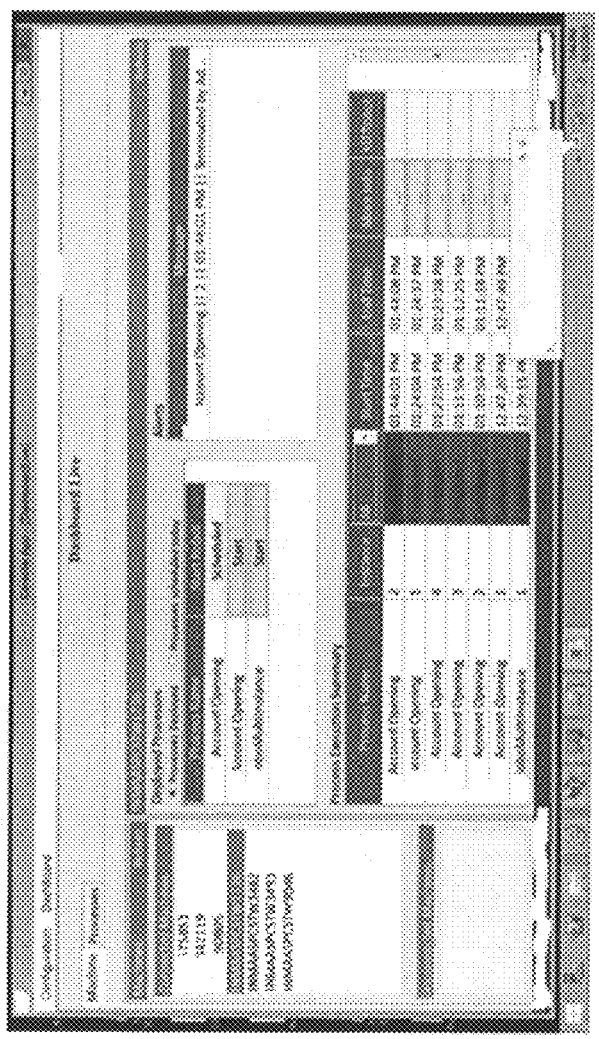

FIG. 3 is a flow chart illustrating a control flow for an example method 300 for performing automated data processing, according to an example embodiment. In a first step 302, initially the software robotic processing system 100 prompts a user set up at step 302. The user set up can be initiated for a plurality of users at one go. At step 304, an user set up initiation is done for master data processing. At step 306, a plurality of robotic clients are defined based on the comprehensiveness and nature of the process/applications taking place. At step 308 once the robotic clients/robos are set up for multiple processes, then the robots begin with the process of administering different robotic processes at step 310. Finally, at step 312 a plurality of robotic processes can be monitored by the user for any un-natural events. The monitoring can happen round the clock or at certain pre-defined intervals.

In the embodiments of the present application, a metrics dashboard is a server hosted website providing real-time robotic process data that manages process transaction volumes, robotic arm statistics, and transaction queue management capabilities for the process supervisor. A user entitlements profile provides an administrator the capability to manage users, and their role based entitlements. A master maintenance profile gives administrator the privileges to add and update users, regions, processes, country, holidays, relationships, and so on.

The administrator can configure robotic processes, execution cycles (auto or manual) and the individual robotic arms. A plurality of robotic client nodes provide privileges to the administrator to configure clients where certain robotic processes can execute and enable two way communication between a console tower and a console tower client.

Extension and Agile Implementation of Robo Console App/Software Robotic Processing System 100

A Console controller comprises a GUI suite (including a process dashboard) that allows the user to view, monitor, and administer the robotic process execution on different robotic client nodes.

CT user entitlements provides administrator the capability to manage business users and their role based entitlements. Further, a process communicator 106 (not shown in Fig) of the Software Robotic Processing System 100 functions as a Windows communication Network™ (WCF) based communication component that resides on the console tower server to perform a secure communication between the server and robotic client.

Furthermore, the console tower services function as a set of systemic services that assist in archival, scheduling, start and stop of process services and so on. The client communicator functions by providing WCF™ services at robotic client in order to communicate with the process communicator 106 at the console tower. Further, the process executor manages process execution at the robotic client, based on daily/periodic scheduling information built at the server.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Among the multiple benefits of the present application and without wishing to be limited by a single list, the technical advantages of the invention are:

a) Automates maintenance activities on the deployed software
b) Automates control activities on the deployed software
c) Reduces manual operations
d) Bridges gap between application teams and operation teams
e) Verifies application functionality after deployment
f) Executing jobs or commands on the computer on which agents are installed The present application overcomes these drawbacks of the background art by providing a system and method for process automation of one or more applications in a computer network having a plurality of computers, in which the one or more application components are preferably interdependent, and optionally and more preferably hierarchical, in terms of their operation.

The present application overcomes the difficulties of the operator to invoke the automated process by preferably having two design phases in at least some embodiments. In the first phase the user, that is preferably a person that is specialized in the application, designs a plurality, and more preferably all, of the possible processes and modulates them into the relevant logical components. Such a process may optionally, for example, install certain software or monitor a certain activity. Such logical components may optionally include but are not limited to for example web-based services or a Data Base. The output of this phase is preferably used by the operator who maps the logical components into the actual environment, for example into the specific enterprise or Data Center. This phase optionally maps each logical component into at least one physical server and each logical connection between components into a physical network.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented system for implementing a proactive process automation among a plurality of software robotic agents in a network, said computer implemented system comprising:
a robotic console module to continuously check and monitor a plurality of deployed software robotic agents in a network;
a graphical user interface to provide an interactive dashboard to view at least one of real time data and historical data to deploy a plurality of the software robotic agents;
a dashboard to provide real time status of execution of one or more robotic processes by the plurality of software robotic agents;
a heartbeat service module to verify and maintain secure connectivity with at least one client node in said network on a pre-defined interval;
a process scheduler to schedule the one or more robotic processes against the at least one connected client node based on scheduling information;
an archive service module to maintain a periodic history of information related to execution of the robotic processes by the deployed software robotic agents; and
a communication service module to facilitate a secured communication channel between a server and the at least one client node, wherein the secured communication channel is initiated on occurrence of an event comprising a start of a process or at least one of completion or termination of the process, and
deploy a client bridge service at the at least one client node through which the one or more robotic processes communicate to the server, wherein client bridge service provides a loose coupling between the one or more robotic processes and the at least one client node, and
dynamically check a target environment in the deployed software.

2. The computer implemented system of claim 1, wherein said robotic console module stores at least one a plurality of key entities and live transactional data from the at least one robotic client node.

3. The computer implemented system of claim 1, further comprising an administrator console to start and stop the plurality of deployed software robotic agents during an execution.

4. The computer implemented system of claim 1, wherein the plurality of deployed software robotic agents are built on a platform technology.

5. The computer implemented system of claim 1, wherein the robotic console can be integrated with a dashboard to provide a real time alert mechanism to monitor a transaction level of the plurality of deployed software robotic agents.

6. The computer implemented system of claim 1, wherein said system is configured to provide a central platform to configure a plurality of client workstations and further configure the plurality of deployed software robotic agents for at least one workstation.

7. The computer implemented system of claim 1, wherein said system is configured to listen to a plurality of nodes on running processes on the plurality of deployed software robotic agents.

8. The computer implemented system of claim 1, wherein said system runs and configures a plurality of processes and nodes.

9. The computer implemented system of claim 1, wherein said system creates an audit trail to capture information about execution of the plurality of deployed software robotic agents.

10. The computer implemented system of claim 1, wherein said system facilitates real time viewing of alerts raised by the plurality of deployed software robotic agents.

11. The computer implemented system of claim 1, further comprising a client bridge service module to create a generic language independent wrapper for enabling said process automation.

12. A non-transitory computer readable medium having embodied thereon a computer program executed by one or more processors for implementing a proactive process automation among a plurality of software robotic agents in a network, the non-transitory computer readable medium comprising:
a program code for continuously checking and monitoring a plurality of deployed software robotic agents in a network;

a program code for providing an interactive dashboard to view at least one of real time data and historical data to deploy a plurality of the software robotic agents;

a program code for verifying and maintaining secure connectivity with at least one client in said network on a pre-defined interval;

a program code for providing real time status of execution of one or more robotic processes by the plurality of software robotic agents;

a program code for maintaining and processing a periodic history of information related to execution of the robotic processes by the deployed software robotic agents;

a program code for facilitating a secured communication channel between a server and the at least one client node, wherein the secured communication channel is initiated on occurrence of an event comprising a start of a process, or at least one of completion or termination of the process;

a program code for deploying a client bridge service at the at least one client node through which the one or more robotic processes communicate to the server, wherein client bridge service provides a loose coupling between the one or more robotic processes and the at least one client node; and a program code for dynamically checking a target environment in the deployed software.

* * * * *